May 23, 1939.  R. R. STEVENS  2,159,825
DUST GUARD
Filed April 27, 1937  2 Sheets-Sheet 1
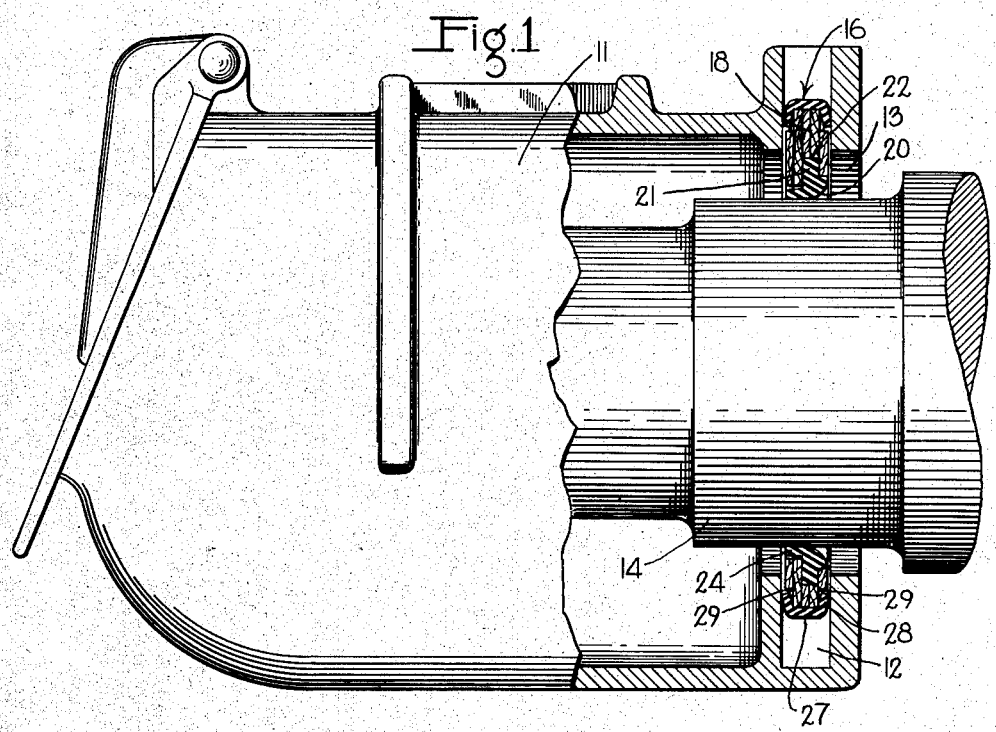
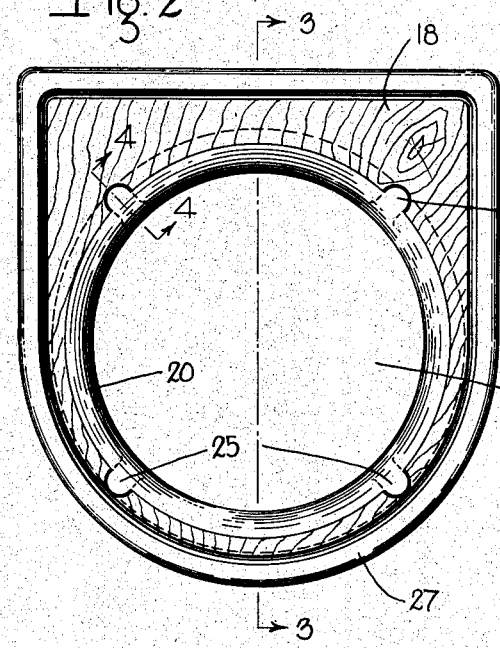
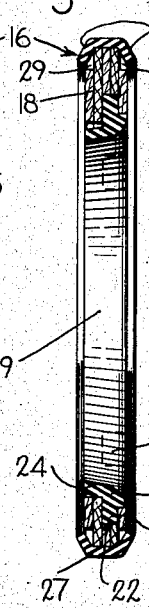
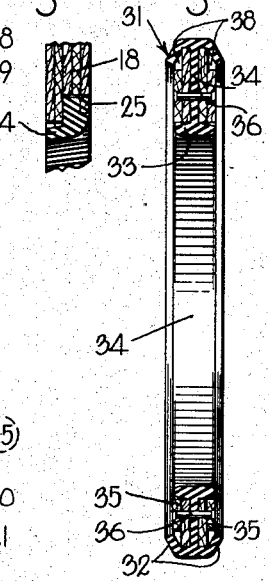
INVENTOR
ROY R. STEVENS
BY Wm. A. Cady
ATTORNEY May 23, 1939.  R. R. STEVENS  2,159,825
DUST GUARD
Filed April 27, 1937   2 Sheets-Sheet 2
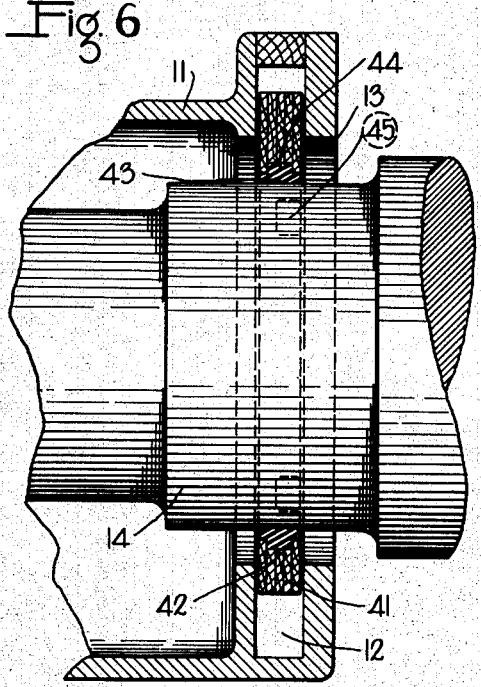
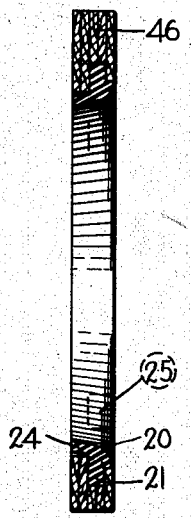
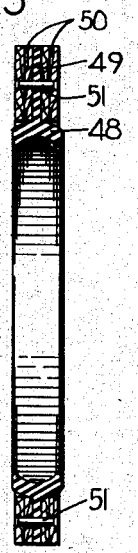
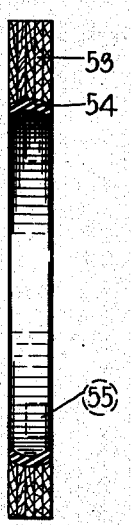
INVENTOR
ROY R. STEVENS
BY
ATTORNEY Patented May 23, 1939

2,159,825

UNITED STATES PATENT OFFICE 2,159,825

DUST GUARD

Roy R. Stevens, Forest Hills, Pa., assignor to The Westinghouse Air Brake Company, Wilmerding, Pa., a corporation of Pennsylvania Application April 27, 1937, Serial No. 139,183

3 Claims. (Cl. 286—6)

This invention relates to car journal boxes and more particularly to adjust guard for a journal box.

The principal object of my invention is to provide an improved dust guard, which may be cheaply manufactured and will provide effective protection of the usual car journal box for a long service period.

In the accompanying drawings, Fig. 1 is a side elevation of a journal box having one form of my improved dust guard associated therewith; Fig. 2 is a plan view of the dust guard shown in Fig. 1; Fig. 3 is a view taken on the line 3—3 of Fig. 2; Fig. 4 is a fragmentary sectional view taken on the line 4—4 of Fig. 2; Fig. 5 is a sectional side view of a dust guard constructed according to another form of my invention; Fig. 6 is a vertical sectional view of a journal box containing a dust guard embodying a further modification of my invention; and Figs. 7, 8, and 9 are sectional side views of dust guards illustrating various other embodiments of the invention.

As shown in Fig. 1 of the drawings, there is provided a journal box 11, which may be of the usual type having a vertical slot 12 formed at the inner end surrounding the opening 13 through which the axle 14 of a car extends into the journal box. Carried within the slot 12 is a dust guard 16 embodying one form of my invention.

As is best shown in Figs. 2 and 3 of the drawings, the dust guard 16 comprises a body portion 18 having a circular opening 19 through which the car axle is adapted to extend. The body portion 18 may be made of any suitable material, and in the drawings is illustrated as comprising a plurality of laminated wooden layers, which may be joined together by cement or glue.

According to my invention, a resilient ring 20 is fitted within the opening 19 in the dust guard 16, the ring having an annular tongue or bead 21 which is adapted to be fitted within a suitable interior groove 22 formed in the body portion 18. The ring 20 is made of a resilient material, such as rubber, and has an inner flange 24 in the form of a truncated cone, which flange is adapted to engage the axle 14 in the manner illustrated in Fig. 1 of the drawings. Radially extending lugs 25 are formed on the outer portion of the ring 20 and are adapted to be fitted within suitable recesses in the body portion 18 for preventing the ring from rotating with the axle 14.

Surrounding the periphery of the body portion 18 of the guard 16 is a channeled sealing member 27 which, like the ring 20, is preferably made of a resilient material such as rubber. The sealing member 27 is provided with outwardly extending flanges 28, which with the dust guard mounted in the journal box 11 as shown in Fig. 1, are adapted to engage the walls of the slot 12. It will be noted that due to the form of the sealing member 27, the flanges 28 are adapted to be flexed inwardly when the dust guard is in the slot 12 of the journal box, the body portion 18 being provided with suitably counter-sunk marginal grooves 29 for receiving the flanges 28. The flanges 28 are thus resiliently maintained in sealing engagement with the walls of the slot 12 in order to prevent access of dirt to the axle bearing.

Another form of the invention is illustrated in Fig. 5 of the drawings, in which the dust guard comprises a moulded portion 31 made of resilient material such as rubber and having an outer channeled portion including outwardly extending flanges 32, and an inner sealing ring 33 which defines a circular opening 34 and is joined to the outer channeled portion by means of a web 34. The web 34 is supported or reinforced by laminated wood sections 35 disposed on opposite sides thereof, the parts being held together by any suitable manner such as by means of the rivets 36. The laminated wood sections 35 are provided with marginal recesses 38 for receiving the flanges 32 when the dust guard is inserted in the journal box, as will be understood from the description presented in connection with Fig. 1. The sealing ring 33 of the moulded portion 31 is of course adapted for resilient engagement with the car axle.

Another form of dust guard embodying features of my invention is shown mounted in the journal box 11 in Fig. 6 of the drawings, in which the dust guard comprises a body portion 41 of laminated wood construction having an interior annular groove 42, and a moulded sealing ring 43 provided with an annular bead 44 which fits within the groove 42. The sealing ring 43 is provided with a plurality of lugs 45 which extend outwardly therefrom and are adapted to be inserted within suitable recesses formed in the body portion 41 of the guard for preventing undesired turning of the ring 43.

The dust guard shown in Fig. 7 of the drawings is somewhat similar to that illustrated in Figs. 1, 2 and 3, except that the sealing member 27 is omitted, the inner sealing ring 20 being fitted within the circular opening in the laminated wood body 46, the outer margin of which is left plain.

In Fig. 8 there is illustrated another form of my improved dust guard, in which a resilient sealing ring 48 is provided for engaging the car axle, said ring being moulded in an arcuate form with an interior annular depression and having a flat web portion 49 which is clamped between a pair of laminated wood body sections 50 by means of rivets 51. When the dust guard shown in Fig. 8 is mounted in the journal box and the axle is extended through the opening therein, the ring portion 48 is deflected so as to be given a cylindrical contour and due to the inherent resiliency thereof is maintained in constant sealing engagement with the axle.

A somewhat simpler form of dust guard is shown in Fig. 9 of the drawings, in which a laminated wood body portion 53 is provided with an inner concave groove defining the circular opening through the dust guard, the groove being adapted to receive a sealing ring 54 made of resilient material such as rubber. The sealing ring 54 is arcuate in cross section, as shown in Fig. 9, and is provided with outwardly extending lugs 55 for gripping the body portion 53 as hereinbefore explained.

It will thus be apparent that I have provided an improved dust guard of durable and at the same time inexpensive construction, which is adapted to prevent access of foreign matter to the axle bearing regardless of relative movement of the parts or of wear.

While several illustrative embodiments of the invention have been described in detail, it is not my intention to limit its scope otherwise than by the terms of the appended claims.

Having now described my invention, what I claim as new and desire to secure by Letters Patent, is:

1. A dust guard for car journal boxes comprising, in combination, a moulded rubber portion having an inner annular sealing lip surrounded by a flat web portion terminating in an outer channeled sealing portion, rigid reenforcing sections disposed on opposite sides of said flat web portion, and means for clamping said rigid members and said web portion together.

2. A dust guard for car journal boxes comprising, in combination, a rigid body portion having a circular opening formed therein, a flexible annular sealing member mounted within said opening and having lugs formed thereon and fitted within suitable recesses formed in said body portion, and a channeled sealing member fitted around the peripheral edge of said body portion and having outwardly extending flexible flanges formed thereon, said body portion having marginal recesses following the contour thereof for receiving said flexible flanges.

3. A dust guard for a car journal box comprising, in combination, a rigid body portion having marginal recesses following the contour of said portion and provided with a circular opening, a flexible annular sealing portion disposed within said opening, and a flexible channel sealing portion engaging the peripheral edge of said body portion and having outwardly inclined yieldable flanges formed thereon, said flanges being adapted to be flexed into said marginal recesses.

ROY R. STEVENS.